N. LONGFEATHER.
PROCESS FOR TREATING TREES.
APPLICATION FILED OCT. 23, 1912.
1,070,499.
Patented Aug. 19, 1913.
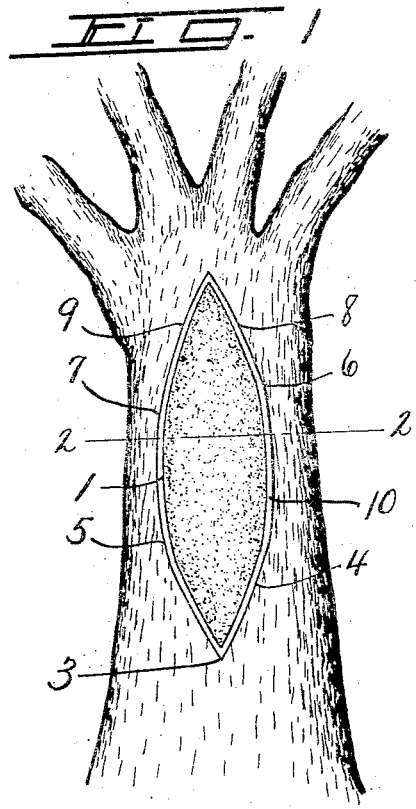
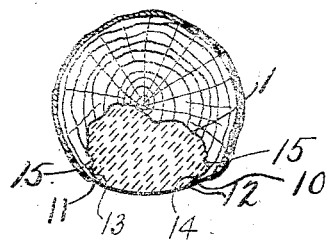

UNITED STATES PATENT OFFICE.

NICHOLAS LONGFEATHER, OF ATLANTA, GEORGIA.

PROCESS FOR TREATING TREES.

1,070,499.      Specification of Letters Patent.    Patented Aug. 19, 1913.

Application filed October 23, 1912. Serial No. 727,460.

*To all whom it may concern:*

Be it known that I, NICHOLAS LONG-FEATHER, an Apache Indian, residing at Atlanta, in the county of Fulton, State of Georgia, have invented new and useful Improvements in Processes for Treating Trees, of which the following, taken in connection with the accompanying drawings, is a full, clear, and exact description.

This invention relates to certain improvements in the manner of treating bruises or wounds in the trunk or branches of a live tree whereby the sound and uninjured portions remaining after the removal of the decayed or foreign matter are left in such form that each and every part is properly nourished by the remaining vascular bundles and further disintegration or decay prevented.

It is well known in the art of forestry that the vascular bundles in trees run substantially parallel to each other, and I have discovered that when the decayed portions are removed and the cavity to be filled with cementitious material has been formed substantially rectangular or oval shaped in a vertical cross section, as has been customary in the art, that some of the vascular bundles are permanently cut off, thus affecting the communication between the root system and the branches and this in proportion to the breadth of the cavity, so that if the portions directly above or below a cavity receive any nourishment it must be transferred to these parts from the remaining uninjured vascular bundles. I have discovered that the vascular bundles will feed nourishment to the solid portions of the tree remaining around the cavity in substantially straight lines of V-shaped formation; that is, the vascular bundles will transfer nourishment at acute angles extending upward from the normal direction of the flow and will not transfer in a direct line across the flow, and that, when a cavity is formed in the tree and the nourishment seeks to find its way upward around the cavity, it separates at the bottom below the cavity and joins at the top above the cavity at an angle dependent somewhat in degree upon the width of the cavity so that the lines bordering the nourished portion of the tree form a vertex both above and below the cavity and, if the cavity is formed square or even circular across the bottom and top or in any form except V-shaped, a three cornered portion above and below the cavity remains unnourished by the natural circulation and as a result dies so that the work must be done over.

A further object of forming the cavity V-shaped at the bottom is that all drainage and other water flows rapidly down into the vertex and is discharged thereby.

Another object of my invention is to so form the wall of the cavity at the outer edge thereof that it will expand somewhat under the pressure of the filling material and as the filling material contracts it will tend to take up this contraction so that the joint between the outer edge of the wall of the cavity and the filling material is always tight and substantially water proof, and I have discovered that this object is obtained by cutting out the cavity until acute angles preferably not greater than 45°, are formed by the meeting of the circumferential line of the tree and the circumferential line of the cavity, forming at each edge of the cavity a thin flexible flange.

Another object is to provide room for the expansion of the bark around the cavity and at the same time a space to receive a medicinal compound for protecting the cambium layer until the new bark forms and to stimulate and hasten the growth of the bark and to cover the joint between the wall of the cavity and the filling material to prevent the entrance of water or moisture therein until the bark has had time to cover this joint, and this object is acomplished by cutting away a portion of the bark around the cavity to leave a border or margin of solid wood to which is applied the healing compound the composition and use of which is clearly described in Patent No. 1,028,233 granted to me June 4th, 1912, for "composition for treating trees."

Another object is to form an anchorage for the filling material by forming or leaving a rib of sound wood extending vertically around the cavity and a short distance from the outer edge thereof.

Other objects and uses will be brought out in the following description.

In the drawings—Figure 1 is a view of a tree having an unsound portion treated in accordance with my process. Fig. 2 is a cross section on line 2—2, Fig. 1.

—1— is the border line of a cavity in the tree —A— and has a filling —2— of cementitious material. The lines of the cavity meet at a vertex at both top and bottom, so that the cavity itself is wedge shaped at both top and bottom and preferably the lines forming the top and bottom of the cavity rise slightly from the horizontal as they extend inwardly in the tree, so that the moisture will flow outwardly. The result of this construction is that the nourishment carried upwardly by the vascular bundles will be transferred naturally from the vertex —3— directly along the border lines —4— upon the one side and —5— upon the other. Likewise at the top, the vascular bundles at points —6— and —7— will transfer their nourishment along the lines —8— and —9— extending upward at an acute angle to the normal flow, so that every remaining portion of the tree is properly nourished.

—10— is a border or margin around the edge of the cavity from which the bark has been cut away to allow for the expansion of the surrounding bark and to receive a stimulating compound adapted to hasten the growth of healthy bark and to cover the joint between the tree and the filling compound to prevent the entrance of water until the bark grows over the joint.

The cavity is so cut out that the angle formed at the points 11 and 12 by the meeting of lines 13 and 14 is acute and preferably, as shown here, less than forty-five degrees so that at these points are formed opposite, thin flexible and pliable flanges, and the wood at this point will give without breaking under the weight or subsequent expansion of the filling material and will tend to return to its normal position and to take up any contraction so that the joint is always tight between the wood and the filling material.

A short distance back of the edge of the cavity is formed a rib or anchorage —15— by leaving a strip of sound wood extending outwardly into the cavity. This prevents any possible displacement of the filling material.

What I claim is:

1. A process for treating trees comprising the removal of the decayed or injured portion, the formation of a cavity therein having a V-shaped top and bottom and then filling the cavity.

2. A process for treating trees comprising the removal of the decayed or injured portion, the formation of a cavity having a vertex at the bottom and then filling the cavity.

3. A process for treating trees comprising the removal of the decayed or injured portion, the formation of a cavity therein of such form that the circumferential line of the cavity will meet the circumferential line of the tree at acute angles and then filling the cavity.

4. A process for treating trees comprising the removal of the decayed or injured portion, the formation of a cavity having a portion of the bark along the edge thereof cut away to leave a margin of solid wood then filling the cavity and covering the margin of solid wood with a stimulating compound.

5. A process for treating trees comprising the removal of the decayed or injured portion, the formation of a cavity having a vertex at its top and then filling the cavity.

6. A process for treating trees comprising the removal of the decayed or injured portion, the formation of a cavity having a vertex at its top and bottom and thin flexible flanges forming the wall of the cavity at the outer edge thereof, and filling the cavity.

7. A process for treating trees comprising the removal of the decayed or injured portion, the formation of thin flexible flanges to form the upright walls of the cavity at the outer edge thereof.

In witness whereof I have hereunto set my hand this 13th day of September 1912.

NICHOLAS LONGFEATHER.

Witnesses:
 WILLIAM LEE,
 HUGH M. SCOTT.

---

Copies of this patent may be obtained for five cents each, by addressing the "Commissioner of Patents, Washington, D. C."